United States Patent
Song et al.

(10) Patent No.: US 10,397,917 B2
(45) Date of Patent: *Aug. 27, 2019

(54) METHOD AND ARRANGEMENT FOR CONFIGURING CSI MEASUREMENTS

(71) Applicant: Telefonaktiebolaget LM Ericsson (publ), Stockholm (SE)

(72) Inventors: Xinghua Song, Beijing (CN); Erik Eriksson, Linköping (SE); Rui Fan, Beijing (CN); George Jöngren, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,053

(22) Filed: Sep. 26, 2017

(65) Prior Publication Data

US 2018/0092088 A1 Mar. 29, 2018

Related U.S. Application Data

(63) Continuation of application No. 14/442,431, filed as application No. PCT/CN2014/084884 on Aug. 21, 2014, now Pat. No. 9,807,763.

(30) Foreign Application Priority Data

Aug. 21, 2013 (WO) ................ PCT/CN2013/081923

(51) Int. Cl.
*H04W 4/00* (2018.01)
*H04W 72/04* (2009.01)
(Continued)

(52) U.S. Cl.
CPC ....... *H04W 72/0446* (2013.01); *H04L 1/0026* (2013.01); *H04L 5/0048* (2013.01);
(Continued)

(58) Field of Classification Search
None
See application file for complete search history.

(56) References Cited

U.S. PATENT DOCUMENTS 8,750,237 B2 * 6/2014 Pan ...................... H04B 7/0626
370/278
9,807,763 B2 * 10/2017 Song ..................... H04L 1/0026
370/329
(Continued)

FOREIGN PATENT DOCUMENTS

CN 101635932 A 1/2010
CN 101877608 A 11/2010
(Continued)

OTHER PUBLICATIONS

Unknown, Author, "On CSI-RS and CSI-IM for NCT", Ericsson, ST-Ericsson, 3GPP TSG-RAN WG1 #74, Barcelona, Spain, R1-133406, Aug. 19-23, 2013, 1-3.
(Continued)

*Primary Examiner* — Anh Vu H Ly
(74) *Attorney, Agent, or Firm* — Murphy, Bilak & Homiller, PLLC

(57) ABSTRACT

Embodiments described herein provide a method in a network node for configuring interference measurements for a wireless device. According to the method, the network node receives information indicating whether a channel state information interference measurement (CSI-IM) resource configuration restriction applies for the wireless device. The network node further configures CSI-IM resources for the wireless device based on the information.

20 Claims, 10 Drawing Sheets

(51) Int. Cl.
  *H04L 1/00*   (2006.01)
  *H04W 8/22*   (2009.01)
  *H04W 24/10*   (2009.01)
  *H04L 5/00*   (2006.01)
  *H04L 5/14*   (2006.01)
  *H04W 72/08*   (2009.01)

(52) U.S. Cl.
  CPC ............ *H04W 8/22* (2013.01); *H04W 24/10* (2013.01); *H04W 72/042* (2013.01); *H04L 5/14* (2013.01); *H04W 72/085* (2013.01)

(56) References Cited

U.S. PATENT DOCUMENTS

| | | | |
|---|---|---|---|
| 2012/0113812 A1 | 5/2012 | Ji et al. | |
| 2013/0196675 A1 | 8/2013 | Xiao et al. | |
| 2013/0258965 A1 | 10/2013 | Geirhofer et al. | |
| 2014/0093004 A1 | 4/2014 | Gomadam et al. | |
| 2014/0126496 A1* | 5/2014 | Sayana | H04B 7/024 370/329 |
| 2014/0198751 A1 | 7/2014 | Prasad et al. | |
| 2014/0269451 A1 | 9/2014 | Papasakellariou et al. | |
| 2014/0269460 A1* | 9/2014 | Papasakellariou | H04L 5/1469 370/294 |
| 2014/0334355 A1 | 11/2014 | Ekpenyong et al. | |
| 2015/0036519 A1 | 2/2015 | Rahman et al. | |
| 2015/0124663 A1* | 5/2015 | Chen | H04L 5/0053 370/278 |
| 2015/0162966 A1* | 6/2015 | Kim | H04B 17/00 370/252 |
| 2015/0215018 A1 | 7/2015 | Yang et al. | |
| 2015/0280878 A1* | 10/2015 | Lee | H04L 5/0048 370/252 |
| 2015/0288505 A1* | 10/2015 | Park | H04L 5/0073 370/336 |
| 2015/0304081 A1* | 10/2015 | Park | H04L 5/0048 370/329 |
| 2016/0050648 A1* | 2/2016 | Seo | H04B 7/0626 370/329 |
| 2016/0227429 A1* | 8/2016 | Park | H04B 17/24 370/329 |
| 2016/0242054 A1* | 8/2016 | Lee | H04B 17/345 370/329 |
| 2017/0034727 A1* | 2/2017 | Li | H04L 5/0048 370/329 |
| 2017/0041059 A1* | 2/2017 | Yi | H04W 76/16 370/329 |
| 2017/0078909 A1* | 3/2017 | Davydov | H04W 72/12 370/329 |
| 2017/0170940 A1* | 6/2017 | Lee | H04L 5/0048 370/329 |
| 2017/0188371 A1* | 6/2017 | Kim | H04W 24/10 370/329 |

FOREIGN PATENT DOCUMENTS

| | | |
|---|---|---|
| CN | 102082636 A | 6/2011 |
| CN | 103516464 A | 1/2014 |
| WO | 2012064265 A1 | 5/2012 |
| WO | 2013085150 A1 | 6/2013 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.3.0, Jun. 2013, 1-176.

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Jun. 2013, 1-108.

Unknown, Author, "On CSI enhancements for Dynamic TDD", Ericsson, ST-Ericsson, 3GPP TSG-RAN WG1 #74, R1-133414, Barcelona, Spain, Aug. 19-23, 2013, 1-3.

* cited by examiner

Example network node

Example wireless device

METHOD AND ARRANGEMENT FOR CONFIGURING CSI MEASUREMENTS

TECHNICAL FIELD

The present invention relates generally to channel state information (CSI) measurements in wireless communication systems, and in particular to methods and arrangements for configuration of CSI interference measurements.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Radio Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 Hz when carrier aggregation is employed. LTE is also able to operate in different frequency bands and can operate in at least Frequency Division Duplex (FDD) and Time Division Duplex (TDD) modes.

LTE uses Orthogonal Frequency Division Multiplexing, OFDM, in the downlink and Discrete Fourier Transform, DFT-spread OFDM in the uplink. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 ms, each radio frame consisting of ten equally-sized subframes of length $T_{subframe}=1$ ms.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain, thereby providing frequency diversity for data channel transmitted using these distributed VRBs.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI) indicated by the physical CFI channel (PCFICH) transmitted in the first symbol of the control region. The control region also contains physical downlink control channels (PDCCH) and possibly also physical Hybrid Automatic Repeat Request (HARQ) indication channels (PHICH) carrying ACK/NACK for the uplink transmission.

The downlink subframe also contains common reference symbols (CRS), also referred to as cell-specific reference symbols, which are known to the receiver and used for coherent demodulation of e.g. the control information. A downlink system with CFI=3 OFDM symbols as control is illustrated in FIG. 3.

In LTE, two radio frame structures are supported: Type 1 applicable to FDD (Frequency Division Duplex), and type 2 applicable to TDD (Time Division Duplex). A type 2 frame structure is illustrated in FIG. 6. In both frame structure types, each radio frame of 10 ms is divided into two half-frames of 5 ms, and each half-frame consists of five subframes of length 1 ms. In frame structure type 2, each subframe is either a downlink subframe, an uplink subframe or a special subframe giving rise to different TDD configurations, as shown e.g. in FIG. 7. The special subframe provides a guard period when switching from downlink to uplink transmission, or vice versa.

The supported uplink-downlink configurations in LTE TDD are listed in Table 1 where, for each subframe in a radio frame, "D" denotes the subframe is reserved for downlink transmissions, "U" denotes the subframe is reserved for uplink transmissions and "S" denotes a special subframe with the three fields: A downlink part, DwPTS, a guard period, GP and an uplink part UpPTS, which are shown in FIG. 6. The length of DwPTS and UpPTS is given by Table 1 subject to the total length of DwPTS, GP and UpPTS being equal to 1 ms. Each subframe consists of two slots, each of length 0.5 ms.

Uplink-downlink configurations with both 5 ms and 10 ms downlink-to-uplink switch-point periodicity are supported. In case of 5 ms downlink-to-uplink switch-point periodicity, the special subframe exists in both half-frames.

In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

In a TDD cell, a TDD configuration is characterized by both uplink-downlink configuration and special subframe configuration. Therefore, the term TDD configuration used hereinafter refers to a combination of uplink-downlink configuration and special subframe configuration. It should be noted that more TDD configurations than the ones listed in table 1 may be introduced in the future. The herein described embodiments are not limited to the existing TDD configurations, rather they are equally applicable to new configurations that may be defined in future.

TABLE 1

Uplink-downlink configurations

| Downlink-to-Uplink Switch-point periodicity | | Subframe number | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

Uplink-downlink configurations

| Downlink-to-Uplink Switch-point periodicity | | Subframe number | | | | | | | | |
|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

Dynamic TDD and (F)eICIC

Dynamic TDD is currently discussed in 3GPP. With dynamic TDD, each cell can switch its UL-DL configuration according to instantaneous traffic demand. In dynamic TDD, the subframes can be divided into two types: static subframes and flexible subframes. The static subframes have fixed link directions, i.e. they are either designated as static downlink subframes, or static uplink subframes, while flexible subframes can be dynamically changed between the uplink (UL) and downlink (DL) directions.

Considering user equipment (UE) reception (DL) in the two types of subframes, the interference situations may be different. In static DL subframes, the inter-cell interference comes from the neighboring eNB(s) while in flexible subframes the inter-cell interference could either come from neighboring eNB(s) or certain UE(s) served by the neighboring eNB(s) who are currently scheduled with UL transmissions. To capture the different interference situations, separate CSI measurements are preferred for the two types of subframes so that DL scheduling as well as link adaptation can be properly performed.

Enhanced inter-cell interference coordination (eICIC) and its further evolvement (Further enhanced ICIC, or FeICIC) aims to improve the UE performance in cell range expansion (CRE) areas within a heterogeneous network. A UE in the CRE area will experience severe interference from the high power macro base station. With the introduction of time domain ICIC, e.g. almost blank subframe (ABS), the transmission from the macro eNB could be eliminated to a large extent in a certain subset of subframes. Hence, the interference to a pico user is reduced. Similar to dynamic TDD, separate CSI measurement in ABS subframes and non-ABS subframes are specified.

CSI Measurement

For a UE in transmission modes 1-8 or in transmission mode 9 when the parameter pmi-RI-Report is not configured by higher layers, the UE shall derive the channel measurements for computing Channel Quality Information (CQI) based on CRS. For a UE in transmission mode 9 when parameter pmi-RI-Report is configured by higher layers, the UE shall derive the channel measurements based on non-zero power Channel-State Information (CSI) reference signals (NZP CSI-RS). For the above cases (transmission modes 1-9), it is not specified in current standard specifications how to perform interference measurements, but according to common understanding, the interference measurement is based on CRS.

In addition to "conventional" non-zero-power CSI-RS, there is also the possibility to configure a terminal in transmission mode 1-9 with one set of zero-power CSI-RS resources, which has the same structure as non-zero-power CSI-RS resources. Zero-power as well as non-zero-power CSI-RS resource configurations may be associated with:

A certain periodicity (e.g. 5 ms, 10 ms, 20 ms, 40 ms, or 80 ms); and
A certain subframe offset within the period; and
A certain configuration within a resource block pair,
The zero-power CSI-RS resources may, for example, correspond to (non-zero power) CSI-RS of other terminals within the cell, or within neighboring cells. Thus, despite the name, the zero-power CSI-RS resources do not necessarily have zero power. The zero-power CSI-RS resources may also correspond to CSI-IM resources, which will be described in more detail below.

UEs configured in transmission mode 10 may be configured with one or more zero-power CSI-RS resource configuration(s).

For a UE in transmission mode 10, one or more CSI processes can be configured for a UE per serving cell. A CSI reported by the UE corresponds to a CSI process. CSI processes are configured via Radio Resource Control (RRC) signaling, and may be configured with or without PMI/RI reporting. By utilizing two or more CSI processes, the network node may for example configure the UE to provide CSI reports corresponding to different transmission hypotheses, or to different interference conditions.

According to the current specification (3GPP TS 36.213 version 11.3.0), each CSI process is associated with a CSI-RS resource (defined in Section 7.2.5 of TS 36.213). For each CSI process, the UE shall derive the channel measurements based on only the non-zero power CSI-RS within a configured CSI-RS resource associated with the CSI process.

Each CSI process is further associated with a CSI-interference measurement (CSI-IM) resource (defined in Section 7.2.6 of TS 36.213). A CSI-IM configuration is associated with a zero-power CSI RS configuration, and the UE shall derive the interference measurements based on only the zero power CSI-RS within the configured CSI-IM resource associated with the CSI process.

Note that in future versions of the standard, it is not excluded that the UE could derive channel measurements and/or interference measurements based on additional parameters as well.

Two CSI subframe sets may also be configured for a CSI process, enabling the UE to do separate CSI measurements in the different subsets of subframes. The CSI subframe sets are defined for each CSI process in Transmission Mode (TM) 10. It is not excluded that more than two subframe sets will be available in future versions of the standard.

SUMMARY

An object of some embodiments is to provide an improved mechanism for configuring CSI measurement for a wireless device, e.g. a user equipment.

In some embodiments, the object is achieved by providing a UE capability indicator to notify the eNB whether a restriction of CSI-IM resource configuration applies or not, thus enabling the eNB to configure CSI-IM properly. This indicator does not differentiate between FDD/TDD and may in particular be used for Rel-12 and beyond UEs.

Some embodiments provide a method performed by a network node for configuring interference measurements for a wireless device. According to the method, the network node receives, from the wireless device, information indicating whether a channel state information interference measurement, CSI-IM, resource configuration restriction applies for the wireless device. The network node further configures CSI-IM resources for the wireless device based on the information.

Other embodiments provide a network node for configuring interference measurements for a wireless device. The network node comprises a processor and a memory, the memory containing instructions executable by the processor, whereby the network node is operable to receive, from the wireless device, information indicating whether a channel state information interference measurement, CSI-IM, resource configuration restriction applies for the wireless device, and further operable to configure CSI-IM resources for the wireless device based on the information.

Yet further embodiments provide a method performed by a wireless device for performing channel state information, CSI, measurements. According to the method, the wireless device transmits, to a network node, information indicating whether a CSI-IM resource configuration restriction applies for the wireless device. The wireless device further receives, from the network node, one or more CSI-IM resource configurations, wherein the configurations are dependent on whether the CSI-IM resource configuration restriction applies for the wireless device. The wireless device then performs measurements in accordance with the received one or more configurations, and transmits one or more CSI reports comprising the measurements to the network node.

Still further embodiments provide a wireless device configured for performing channel state information, CSI, measurements. The wireless device comprises a processor and a memory. The memory contains instructions executable by the processor, whereby the wireless device is operable to transmit, to a network node, information indicating whether a CSI-IM resource configuration restriction applies for the wireless device. The device is further operable to receive, from the network node, one or more CSI-IM resource configurations, wherein the configurations are dependent on whether the CSI-IM resource configuration restriction applies for the wireless device. Yet further, the device is operable to perform measurements in accordance with the received one or more configurations, and transmit one or more CSI reports comprising the measurements to the network node.

An advantage of some embodiments is providing a mechanism for differentiating UE capabilities in handling restriction of CSI-IM resource configurations, by providing information to the eNB indicating whether the UE is bound by configuration restrictions. This information enables the eNB to configure CSI-IM resources in a flexible way when this is supported by the UE, and to take other measures when flexible configuration of CSI-IM resources is not supported by the UE. Hence, the eNB is enabled to adaptively configure the CSI-IM resources, thereby improving measurement results and avoiding undefined UE behaviour.

DETAILED DESCRIPTION

In order to obtain separate CSI measurements for subframes with different interference levels, one possibility is to utilize restricted CSI measurement sets, i.e. configuring separate CSI subframe sets for the two subframe types. Another option is to configure different CSI processes for different subframe types. Note that usage of restricted CSI measurement sets is possible for single CSI process capable UEs.

Although these options would seem to provide the possibility to provide separate CSI measurements where this is desired, e.g. for flexible and downlink subframes in a dynamic TDD scenario, for transmission mode 10 there are some restrictions in current CSI-IM configurations that complicate both use cases. According to 3GPP TS 36.213, v11.3.0, the eNB cannot assume a UE will handle a CSI-IM configuration that does not meet the following conditions: A UE is not expected to receive CSI-IM resource configuration(s) that are not all completely overlapping with one zero-power CSI-RS resource configuration which can be configured for the UE. A UE is not expected to receive a CSI-IM resource configuration that is not completely overlapping with one of the zero-power CSI-RS resource configurations defined in Section 7.2.7 of 3GPP TS 36.213 v11.3.0.

Section 7.2.7 of 3GPP TS 36.213 provides the following definition of zero-power CSI-RS resources:
For a serving cell and UE configured in transmission mode 1-9, the UE can be configured with one zero-power CSI-RS resource configuration. For a serving cell and UE configured in transmission mode 10, the UE can be configured with one or more zero-power CSI-RS resource configuration(s). The following parameters are configured via higher layer signaling for each zero-power CSI-RS resource configuration:
  Zero-power CSI RS Configuration list (16-bit bitmap ZeroPowerCSI-RS in 3GPP TS 36.211, v11.3.0)
  Zero-power CSI RS subframe configuration $I_{CSI-RS}$. The allowable values are given in Section 6.10.5.3 of 3GPP TS 36.211, v11.3.0.
A UE should not expect the configuration of zero-power CSI-RS and PMCH in the same subframe of a serving cell. For frame structure type 1, the UE is not expected to receive the 16-bit bitmap ZeroPowerCSI-RS with any one of the 6 LSB bits set to 1 for the normal CP case, or with any one of the 8 LSB bits set to 1 for the extended CP case. For frame structure type 2 and 4 CRS ports, the UE is not expected to receive the 16-bit bitmap ZeroPowerCSI-RS with any one of the 6 LSB bits set to 1 for the normal CP case, or with any one of the 8 LSB bits set to 1 for the extended CP case.

This CSI-IM resource configuration restriction is further explained for the case of dynamic TDD in the following.

Figure 1:
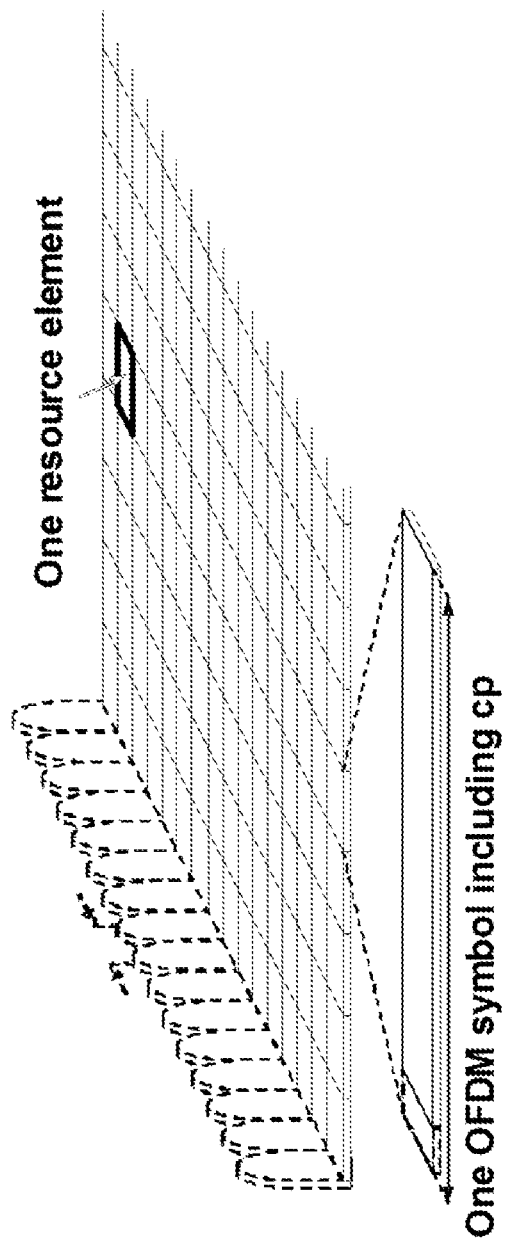
FIG. 1 is a schematic diagram illustrating the LTE downlink physical resource.
Figure 2:
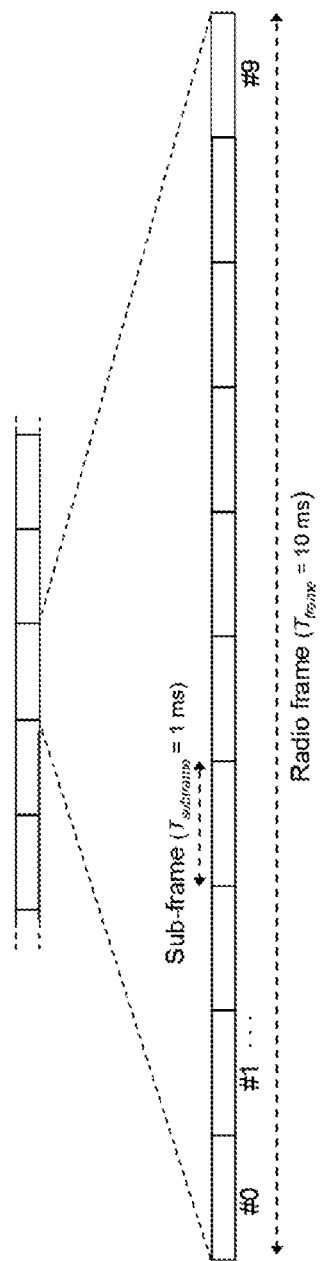
FIG. 2 is a schematic diagram illustrating the LTE time-domain structure.
Figure 3:
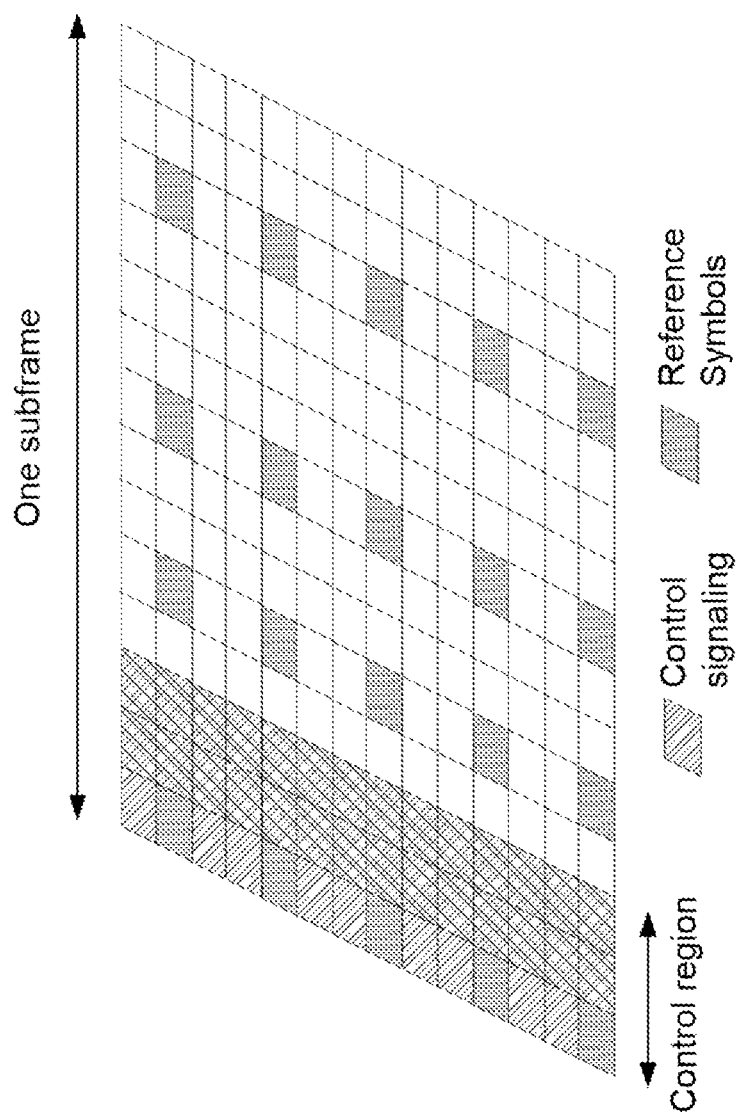
FIG. 3 is a schematic diagram illustrating an LTE downlink subframe.
Figure 4:
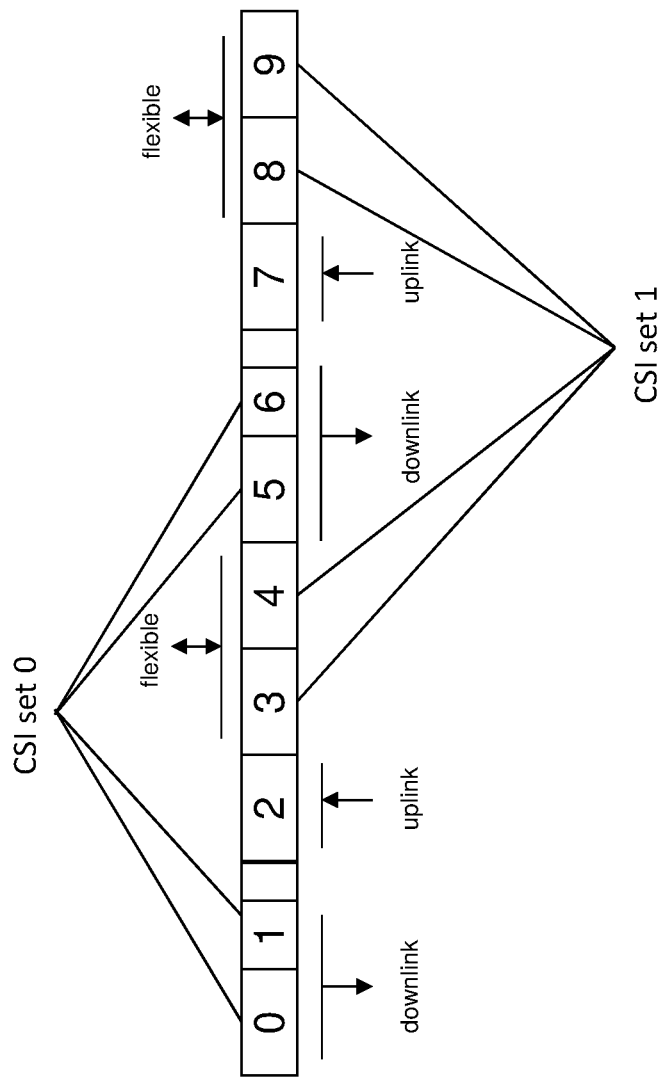
FIG. 4 is a schematic diagram illustrating separate CSI measurement sets configuration for dynamic TDD.

For a UE with single CSI process in TM10, the UE shall derive channel measurements based on the configured non-zero power CSI-RS and derive interference measurements based on the configured CSI-IM. With a single CSI process, only one CSI-IM is configured and this CSI-IM resource configuration should be completely overlapping with one of the zero-power CSI-RS resource configurations. Note that there is an additional restriction associated with ZP CSI-RS configurations: They should have a periodicity which is a multiple of 5 ms. Therefore, it is not possible to have one CSI-IM resource covering both of the CSI measurement sets, since the interval between the two types of subframes is not an integer multiple of 5 ms as shown in FIG. 4. In FIG. 4, the first measurement set "CSI set 0" has been configured to cover the static downlink subframes, and the second measurement set "CSI set 1" covers the flexible subframes. However, considering subframe 0 (a static downlink subframe in CSI set 0) it can be seen that the distance to the subframes in CSI set 1 is either 3, 4, 8, or 9, none of which is a multiple of 5. The same applies for all the other subframes in CSI set 0.

In another case, the UE is configured with two CSI processes and reports multiple CSI reflecting different channel and interference conditions in the two types of subframes.

For the channel part, the downlink transmit power could be different between the two types of subframes if downlink transmit power control is applied. This can well be captured by the parameter Pc that is associated with each CSI process. Therefore, the channel part can be measured based on one common NZP CSI-RS resource configured in the static DL subframes.

Figure 5:
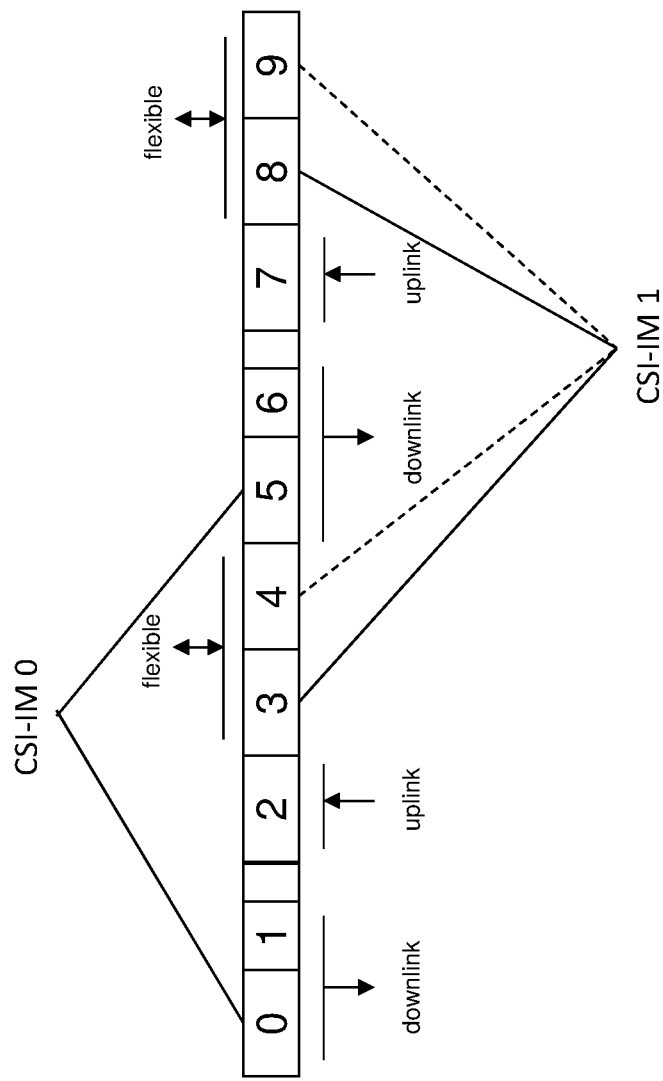
FIG. 5 is a schematic diagram illustrating multiple CSI-IM resource configurations for dynamic TDD.
Figure 6:
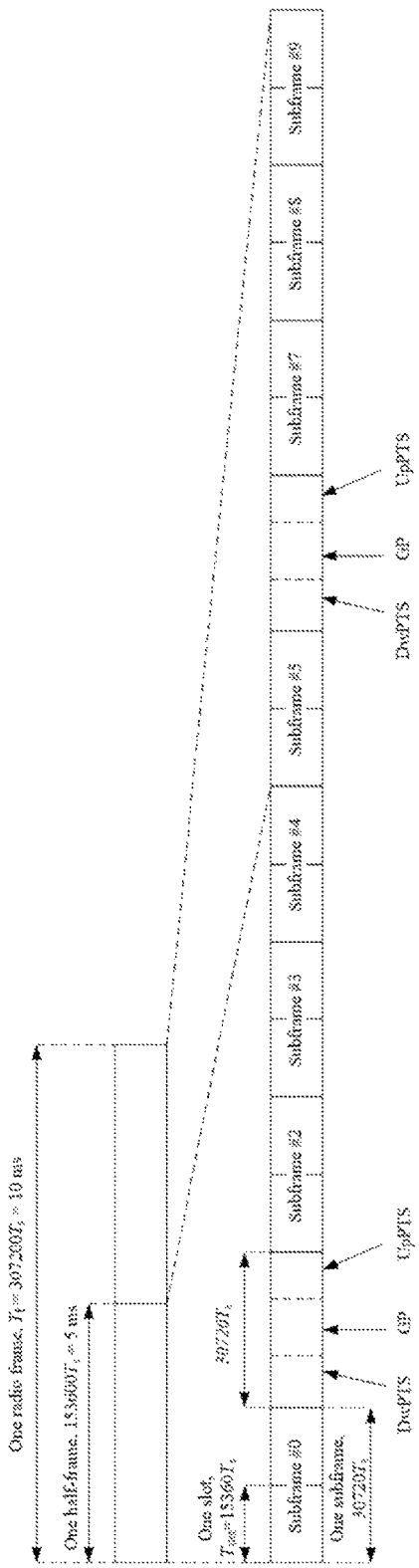
FIG. 6 illustrates the LTE TDD frame structure.
Figure 7:
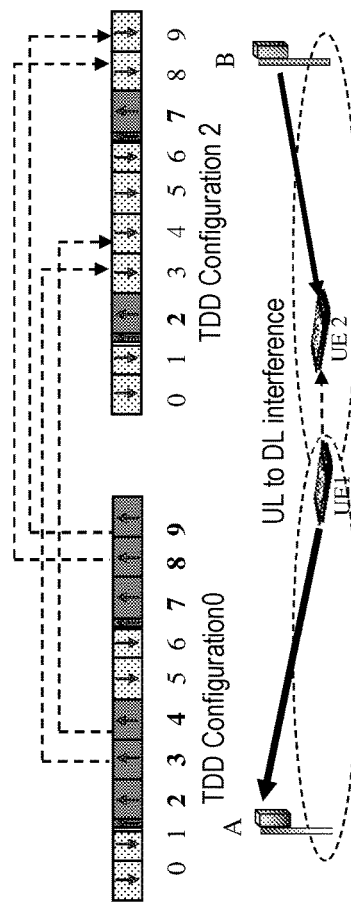
FIG. 7 illustrates different TDD configurations in different cells.

For the interference part, one possibility is to configure two CSI-IM resources in the two types of subframes so that different interference levels can be measured. However, as mentioned above, there is a restriction associated with the CSI-IM resource configurations, namely that a UE is not expected to receive CSI-IM resource configuration(s) that are not all completely overlapping with one zero-power CSI-RS resource configuration which can be configured for the UE. In other words, all CSI-IM resources for the UE must be configured in a way such that they fall on a k*5 ms time grid, where k is an integer and the smallest value of k is 1. As a result, it is not possible to configure two CSI-IM resources to capture the different interference levels since the interval between the two types of subframes is not an integer multiple of 5 ms, see FIG. 5. In FIG. 5, a first CSI-IM resource configuration "CSI-IM 0" covers static downlink subframes 0 and 5 (which are 5 subframes apart) and a second CSI-IM resource configuration "CSI-IM 1" covers flexible subframes 3 and 8 (also 5 subframes apart). Alternatively, configuration "CSI-IM 1" might have been configured to cover flexible subframes 4 and 8 (indicated by the dashed lines). However, neither of these configurations would be allowable, because the subframes in CSI-IM 0 and CSI-IM 1 do not lie on the same k*5 ms time grid.

A reason for the CSI-IM resource configuration restrictions is that some terminals (e.g. release 11 terminals configured in transmission mode 1-9) can only be configured with one single zero-power CSI-RS configuration, and the periodicity of this configuration must be a multiple of 5 ms. Hence, if CSI-IM resources would be configured without the restriction, it would not be possible to configure those terminals to be aware of all the resources where zero-power CSI-RS are transmitted. This could cause decoding problems for these terminals, if they were to be scheduled in the subframes where zero-power CSI-RS are transmitted, because a different PDSCH mapping is used in those subframes. More specifically, the PDSCH mapping avoids the resource elements corresponding to the set of CSI-RS configured for the terminal.

It can be seen that the restriction of CSI-IM resource configurations in the current specification creates limitations to CSI measurement for UEs in TM10. One way to improve the situation is to modify or remove this restriction so that CSI-IM resources no longer have to be configured to fall on the k*5 ms time grid. This would enable the eNB to configure the UE to provide different interference measurements for different TDD subframe types.

However, even if the restriction is removed in future releases of the standard (e.g. for Rel-12 and onwards), as has been proposed in 3GPP contribution paper R1-133414, there will still be legacy UEs in existence for quite some time which are bound by the CSI-IM configuration restriction. If such UEs are configured with an CSI-IM configuration that does not fulfill the conditions, the result is undefined. One possible consequence is that the eNB may not receive proper measurement results from the UE. It would hence be desirable for the network to be able to configure CSI measurements adaptively, depending on whether a certain UE supports CSI-IM resource configuration without restrictions or not. Furthermore, it is noted that since the standard states only that a UE is not expected to receive CSI-IM configurations which do not fulfill the conditions, it is still possible (though not required) for a Rel-11 UE to support such configurations.

Thus, to enable the eNB to configure the UE in an appropriate way, some embodiments provide a UE capability indicator, by which the UE may indicate to the network whether or not the CSI-IM resource configuration restriction applies.

UE Capability Indicator of CSI-IM Configuration

In a first embodiment, a UE capability indicator is sent from the UE to the eNB to indicate whether there is a restriction of CSI-IM resource configuration, whenever the network sends a request for UE capability information.

In one variant, the UE capability indicator could be a new field in the Feature group indicators as shown in Table 2. The UE may set this field to 1 if the restriction of CSI-IM resource configuration does not apply for the UE. The reverse interpretation of the bit is also possible, i.e. the field may be set to 0 if the restriction does not apply, as long as the UE and eNB both agree on the interpretation of the field.

In another variant, a new information element (IE), e.g. CSI-IM-configuration-norestriction, is added in the current UE capability IE UE-EUTRA-Capability. The UE shall set this field to "supported" if the resource of CSI-IM resource configuration does not apply.

It should be noted that it is not excluded that the UE capability indicator, regardless of in which form it is implemented, could be used to jointly indicate two or more capabilities. For example, the indicator could indicate whether the UE supports subframe set-dependent CSI measurements, which would in turn imply that CSI-IM resource configuration restrictions do not apply for the UE.

```
PhyLayerParameters-v12xx ::=    SEQUENCE {
...
CSI-IM-norestriction-r12            ENUMERATED {supported}
OPTIONAL,
    ...
}
```

TABLE 2

Definitions of feature group indicators

| Index of indicator | Definition (description of the supported functionality, if indicator set to one) | Notes | If indicated "Yes" the feature shall be implemented and successfully tested for this version of the specification | FDD/ TDD diff |
|---|---|---|---|---|
| 101 (leftmost bit) | DMRS with OCC (orthogonal cover code) and SGH (sequence group hopping) disabling | if the UE supports two or more layers for spatial multiplexing in UL, this bit shall be set to 1. | | No |
| ... | | | | |
| 117 | non-restricted CSI-IM resource configuration | If a UE support non-restricted CSI-IM resource configuration, this bit shall be set to 1 | | No |
| ... | | | | |

In a further embodiment, when a Rel-11 UE enters a Rel-12 (or beyond) network, including initial access and handover, the UE will report its release information in the IE accessStratumRelease and it will not report UE capabilities regarding to restriction of CSI-IM resource configurations. Then the Rel-12 eNB knows that restriction of CSI-IM resource configuration does apply for this UE.

In another embodiment, when a Rel-12 (and beyond) UE enters a Rel-11 network (including initial access and handover), the UE will report its release information in the IE accessStratumRelease and its capability indicator regarding to CSI-IM configurations. But the Rel-11 eNB could not recognize the field regarding to CSI-IM configuration restriction and thus will configure CSI-IM resources assuming that it is a Rel-11 UE. In one variant, the eNB then configures CSI-IM resources with restrictions.

As a further option, the eNB handles a legacy UE (or, stated differently, a UE that is bound by configuration restrictions) by instructing it to not perform interference averaging. This implies that the UE will report measurements separately for each subframe, thereby enabling the eNB to derive interference information separately for different subframe types. It may be advantageous for the eNB to turn off interference averaging only in situations when the configuration restriction can be expected to cause problems, e.g. when using dynamic TDD.

CSI-IM Resource Configurations

In another embodiment, a Rel-12 (and beyond) eNB shall configure CSI-IM resources for a Rel-12 (and beyond) UE upon receiving the UE capability indicator implying that the restriction of CSI-IM resource configuration does not apply:

For a Rel-12 (and beyond) UE in transmission mode 10, one CSI-IM resource is configured corresponding to each CSI processes. But the CSI-IM resource configuration for each CSI process is not necessarily completely overlapping with one of the zero-power CSI-RS resource configurations configured for this UE. Preferably it could be completely overlapping with certain combinations of the several zero-power CSI-RS resource configurations configured for this UE. For one UE, all CSI-IM resource configuration(s) are not necessarily completely overlapping with one of the zero-power CSI-RS resource configurations that can be configured for this UE.

In another embodiment, for a Rel-12 (and beyond) UE in transmission mode 10, multiple CSI-IM resources can be configured for one CSI process. Each CSI-IM resource is completely overlapping with one of the zero-power CSI-RS resource configurations configured for this UE. However, for this UE, all CSI-IM resource configuration(s) are not necessarily completely overlapping with one of the zero-power CSI-RS resource configurations that can be configured for this UE.

An example method for configuring interference measurements, which may be executed in a network node, will now be described with reference to the flow chart in FIG. 8. The network node may e.g. be an LTE eNodeB. Optionally, the network node uses dynamic TDD transmission. However, it should be noted that the present method could be applicable also to other situations than dynamic TDD, e.g. CoMP.

Figure 8:
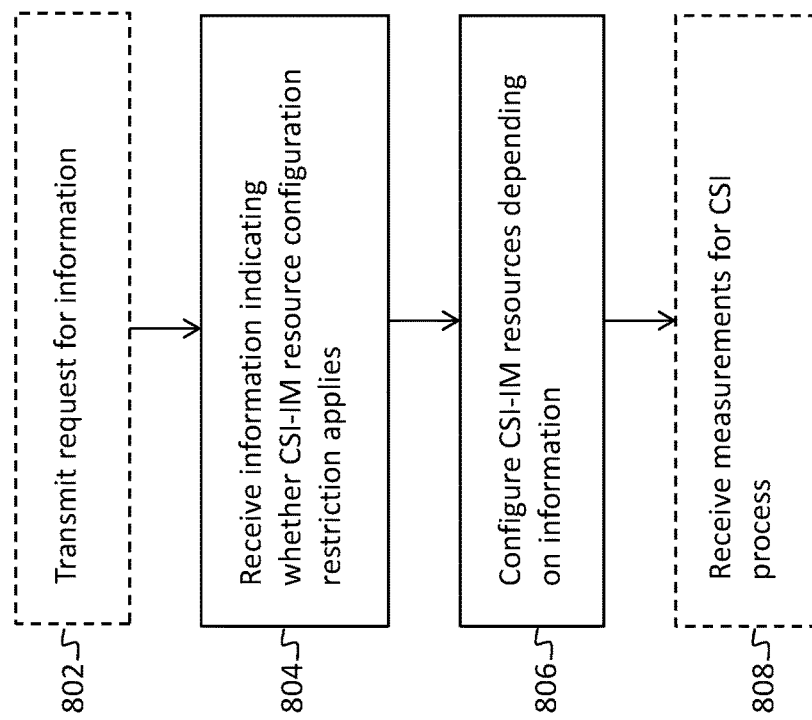
FIG. 8 illustrates an example method in a network node.

According to the method shown in FIG. 8, the network node receives 804 information from a wireless device indicating whether CSI-IM resource configuration restriction applies for that wireless device. The wireless device may e.g. be an LTE UE.

Optionally, this is preceded by the network node transmitting 802 a request to the wireless device to send the information (e.g. a request for transfer of UE capability information).

The received information may, in one variant, comprise capability information for the wireless device, e.g. UE capability information. As explained above, a special capability indicator may be received from the wireless device, which indicates whether there is a restriction of CSI-IM resource configuration for this wireless device. The indicator may e.g. be implemented as a new field in the Feature group indicators, or as a new information element, as previously described. However, it should be noted that for legacy devices, the special indicator will not be present in the UE capability information, in which case the absence of this indicator provides the information to the network node that the CSI-IM configuration restriction applies.

The network node then configures 806 CSI-IM resources for the wireless device based on the information. Thus, the network node configures CSI-IM resources depending on whether the restriction applies or not.

As explained above the information may indicate whether the wireless device is restricted to receiving CSI-IM resource configurations that are all completely overlapping with one zero-power CSI-RS resource configuration which can be configured for the wireless device. Stated differently, the information may indicate whether the wireless device is restricted to receiving CSI-IM resource configurations wherein all CSI-IM resources fall on the same k*5 ms time grid, where k is an integer greater than or equal to 1.

When the information indicates that the restriction does not apply, and the network uses dynamic TDD transmission, the network node may configure CSI-IM resources so that separate interference measurements are obtained for static downlink subframes and for flexible downlink subframes. This may be performed in various different ways, as will be described further below.

In one variant, the network node configures several CSI-IM resources for one CSI process as described above. In particular, two CSI-IM resources may be configured. One CSI-IM resource configuration would overlap with a zero-power CSI-RS configuration which covers static downlink subframes, and the other CSI-IM resource configuration would overlap with another zero-power CSI-RS configuration which covers flexible downlink subframes. In this variant, the CSI process may also be associated with two CSI subframe sets, where one subframe set covers static downlink subframes and the other CSI subframe set covers flexible downlink subframes.

In another variant, when the restriction does not apply the network node configures one CSI-IM resource such that it overlaps with a combination of two or more zero-power CSI-RS resource configurations configured for the wireless device. For example, one CSI-IM resource configuration may be associated with two or more zero-power CSI-RS resource configurations. In a particular example, one CSI-IM resource configuration is associated with two zero-power CSI-RS resource configurations, where one zero-power CSI-RS resource configuration covers downlink subframes, and the other zero-power CSI-RS resource configuration covers flexible subframes. Also in this variant, the CSI process may be associated with two CSI subframe sets as described in the previous paragraph.

When the information indicates that the restriction does apply, the network node in one variant configures the wireless device in accordance with the restrictions. Hence, in this variant the network node will not be able to obtain separate interference measurements for downlink subframes and flexible subframes. However, in another variant, which will be described in more detail below, the network node instructs 1004 the wireless device to not perform interference averaging, for example via an RRC message. When interference averaging is not performed, the network node will receive measurements per subframe, and hence it will be possible for the network node to obtain separate measurement results per subframe type.

After configuring the CSI-IM resources for the wireless device, the network node will receive 808 measurement reports for the CSI process(es) according to the configuration. In more detail, the network node will receive one report for each CSI process, where the report may comprise several measurements associated with this CSI process (although it would also be possible to receive several reports per CSI process). The measurement reports may then be utilized for performing scheduling and/or link adaptation.

Figure 9:
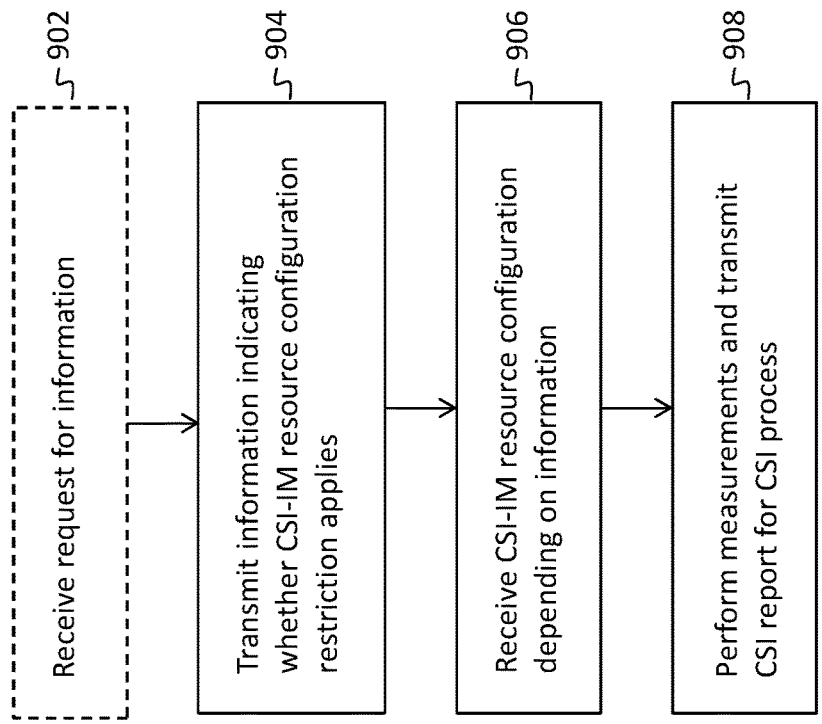
FIG. 9 illustrates an example method in a wireless device.

FIG. 9 shows a corresponding method for performing CSI measurements, which may be executed in a wireless device, e.g. an LTE UE. According to this method, the wireless device transmits 904 information to a network node, e.g. an LTE eNodeB, the information indicating whether CSI-IM resource configuration restriction applies for the wireless device.

Optionally, this is preceded by the wireless device receiving 902 a request from the network node to send the information (e.g. a request for transfer of UE capability information).

The transmitted information may, in one variant, comprise capability information for the wireless device, e.g. UE capability information. As explained above, a capability indicator may be received from the wireless device, which may be implemented in any of the ways described above. Further, as explained above, the presence or absence of this indicator may provide the indication whether CSI-IM configuration restriction applies.

The wireless device then receives 906 a CSI-IM resource configuration from the network node. Also as exemplified above, the resource configuration will be dependent on whether the configuration restriction applies or not.

As explained above the information may indicate whether the wireless device is restricted to receiving CSI-IM resource configurations that are all completely overlapping with one zero-power CSI-RS resource configuration which can be configured for the wireless device. Stated differently, the information may indicate whether the wireless device is restricted to receiving CSI-IM resource configurations wherein all CSI-IM resources fall on the same k*5 ms time grid, where k is an integer greater than or equal to 1.

When the transmitted information indicates that the restriction does not apply, and the wireless device is configured for dynamic TDD transmission, the wireless device may receive one or more CSI-IM resource configurations so that separate interference measurements are obtained for static downlink subframes and for flexible downlink subframes. This may be performed in various different ways, as will be described further below.

In one variant, the wireless device receives several CSI-IM resource configurations for one CSI process as described above. In particular, two CSI-IM resource configurations may be received. One CSI-IM resource configuration would overlap with a zero-power CSI-RS configuration which covers static downlink subframes, and the other CSI-IM resource configuration would overlap with another zero-power CSI-RS configuration which covers flexible downlink subframes. In this variant, the CSI process may also be associated with two CSI subframe sets, where one subframe set covers static downlink subframes and the other CSI subframe set covers flexible downlink subframes.

In another variant, when the restriction does not apply the wireless device receives one CSI-IM resource configuration such that it overlaps with a combination of two or more zero-power CSI-RS resource configurations configured for the wireless device. For example, one CSI-IM resource configuration may be associated with two or more zero-power CSI-RS resource configurations. In a particular example, one CSI-IM resource configuration is associated with two zero-power CSI-RS resource configurations, where one zero-power CSI-RS resource configuration covers downlink subframes, and the other zero-power CSI-RS resource configuration covers flexible subframes. Also in this variant, the CSI process may be associated with two CSI subframe sets as described in the previous paragraph.

The wireless device then performs 908 measurements in accordance with the received configuration, and transmits one or more CSI reports for the CSI process to the network node.

A further example method, which may be executed in a network node, will now be described with reference to the flow chart in FIG. 10. The network node may e.g. be an LTE eNodeB. Optionally, the network node uses dynamic TDD.

Figures 10, 11:
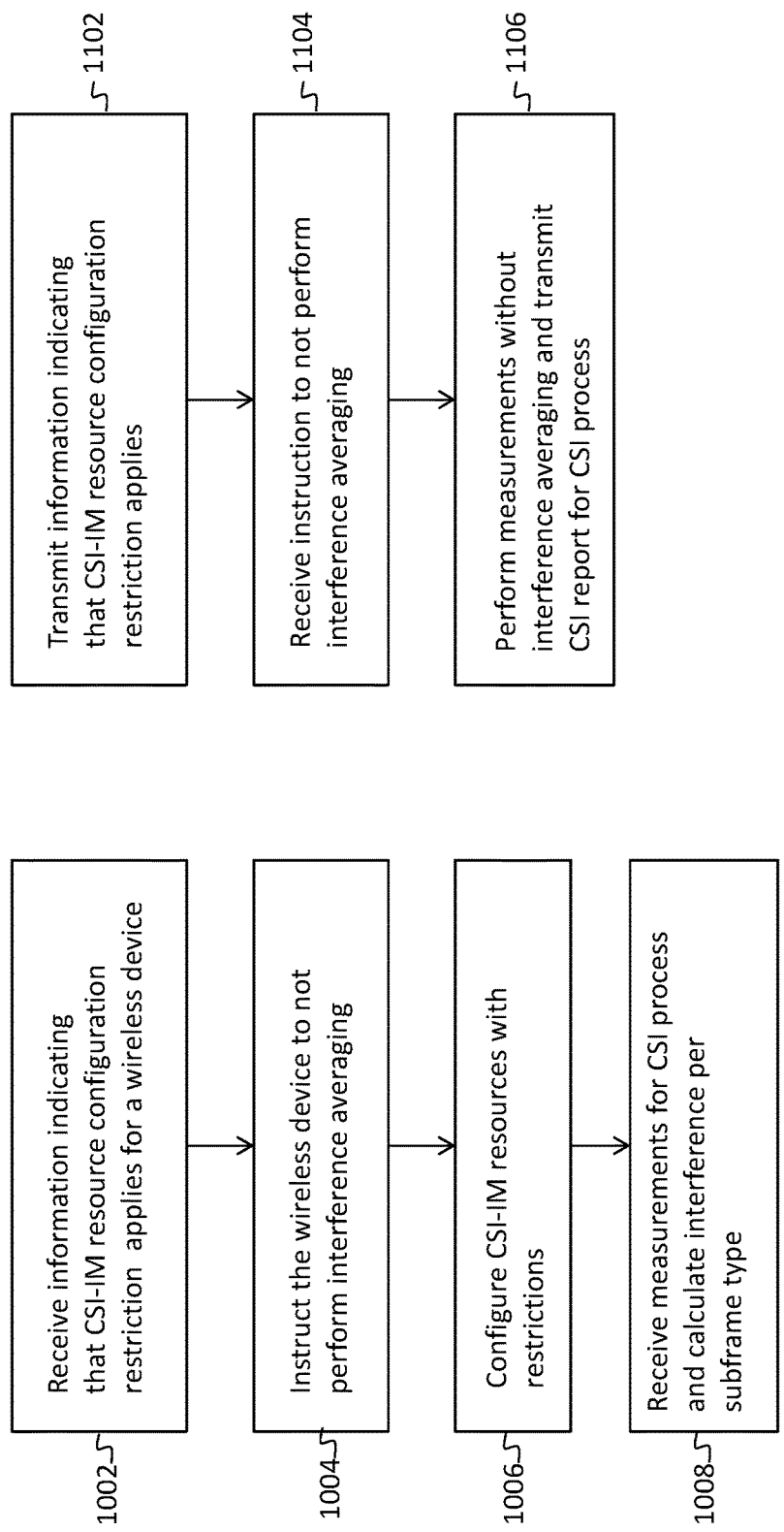
FIG. 10 illustrates an example method in a network node.
FIG. 11 illustrates an example method in a wireless device.

According to the method shown in FIG. 10, the network node receives 1002 information from a wireless device indicating that CSI-IM resource configuration restriction applies for that wireless device. The wireless device may e.g. be an LTE UE. Optionally, this is preceded by the network node transmitting a request to the wireless device to send the information (e.g. a request for transfer of UE capability information).

The received information may, in one variant, comprise UE capability information. As explained above, a special capability indicator may be received from the wireless device, which indicates whether there is a restriction of CSI-IM resource configuration for this wireless device. The indicator may e.g. be implemented as a new field in the Feature group indicators, or as a new information element, as previously described. However, it should be noted that for legacy devices, the special indicator will not be present in the UE capability information, in which case the absence of this indicator provides the information to the network node that the CSI-IM configuration restriction applies.

The network node then configures 1006 CSI-IM resources for the wireless device with restrictions. Furthermore, the network node instructs 1004 the wireless device to not perform interference averaging. It should be noted that steps 1006 and 1004 may be performed in any order. The network node will then receive 1008 measurement reports for the CSI process(es) according to the configuration (in more detail, the network node will receive one report for each CSI process, where the report may comprise several measurements associated with this CSI process). As interference averaging is not performed, the network node will receive separate measurements per subframe, and hence it will be possible for the network node to obtain measurement results per subframe type. This embodiment may advantageously be applied when the network node uses dynamic TDD, and the wireless device is also configured for dynamic TDD transmission. In such a scenario, the network node may configure the CSI-IM resources to cover two or more of the flexible subframes. Different flexible subframes may be subject to differing interference conditions, as the transmission direction of these subframes may be configured in different ways. For example, if a certain flexible subframe is configured as a downlink subframe in the serving cell as well as in neighboring cells, the level of interference in that subframe is likely to be similar to the interference level in the static downlink subframes. Therefore, obtaining separate measurements per subframe may provide the network node with a good picture of the different interference levels.

The measurement reports may then be utilized for performing scheduling and/or link adaptation.

Figure 12:
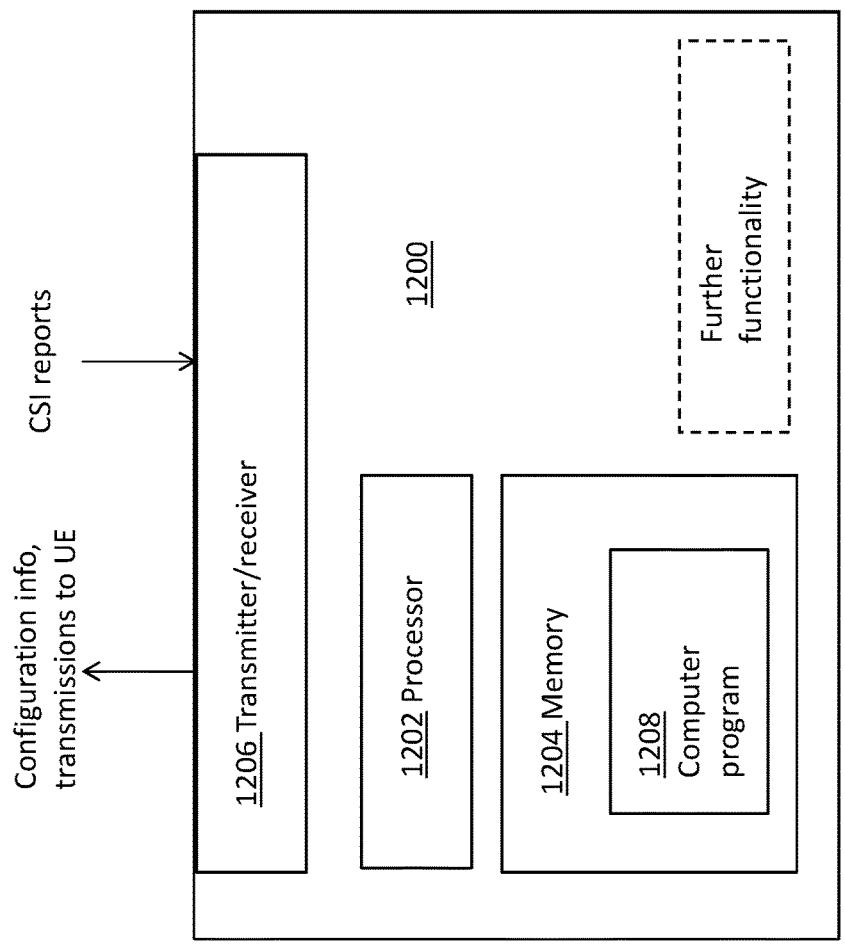
FIG. 12 is a schematic block diagram illustrating an example network node.

FIG. 11 shows a method in a wireless device, e.g. an LTE UE, which corresponds to the method of FIG. 10. Hence, the wireless device transmits 1102 information from a wireless device indicating that CSI-IM resource configuration restriction applies. The wireless device then receives an instruction 1104 to not perform interference averaging. Finally, the wireless device performs 1106 measurements without doing interference averaging, and transmits measurement reports to the network node. Thus, in response to the instruction, measurements will be reported separately per subframe. Below, an example network node, adapted or configured to enable an above described method for configuring CSI measurements in a wireless device will be described with reference to FIG. 12. The network node 1200 could be configured to be operable e.g. in an LTE and/or WCDMA system or in a multi-RAT system. In a particular variant the network node 1200 is an LTE eNB. The network node 1200 is configured to communicate with other entities, in particular with wireless devices (such as LTE user equipments) via a transmitter/receiver. The network node 1200 further comprises a processor 1202 and a memory 1204, and the memory 1204 contains instructions executable by the processor 1202, whereby the network node 1200 is operable to perform a method for configuring CSI measurements as described above (e.g. the method shown in FIG. 8 or FIG. 10). Thus, in one example the network node (1200) is operable to receive, from the wireless device, information indicating whether a channel state information interference measurement, CSI-IM, resource configuration restriction applies for the wireless device, and further operable to configure CSI-IM resources for the wireless device based on the information.

The network node 1200 may further comprise other functional units, and may further comprise one or more storage units.

Figure 13:
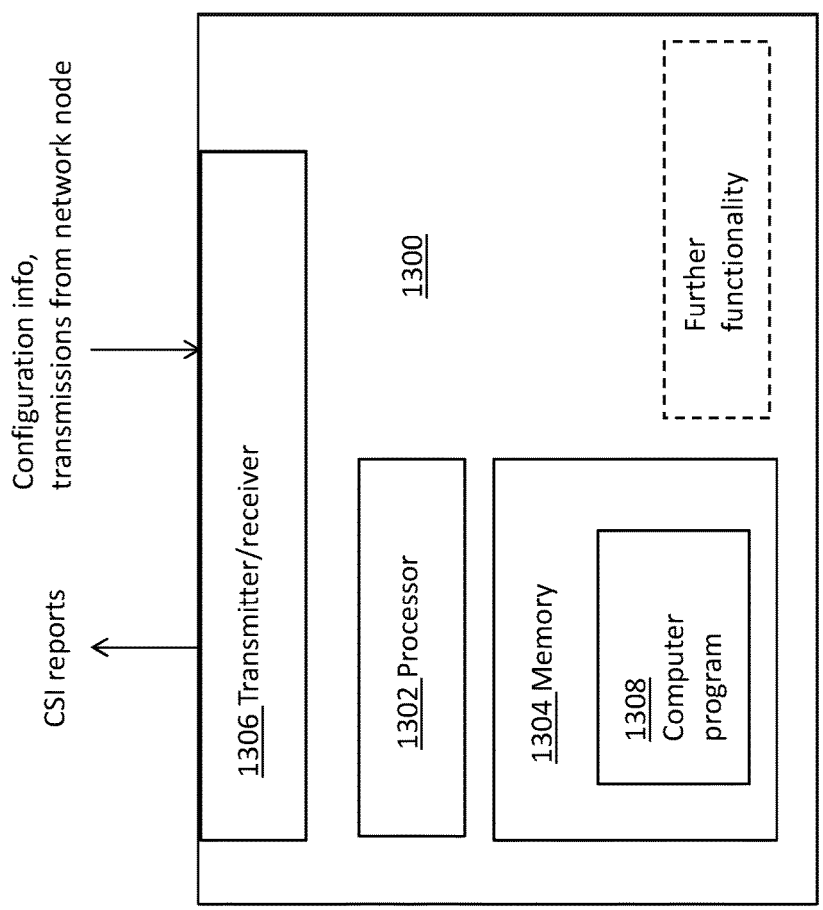
FIG. 13 is a schematic block diagram illustrating an example wireless device.

An example wireless device will now be described with reference to FIG. 13. The wireless device 1300 could be configured to be operable e.g. in an LTE and/or WCDMA system or in a multi-RAT system. In a particular variant the wireless device 1300 is an LTE UE. The wireless device 1300 is configured to communicate with other entities via a transmitter/receiver. The wireless device 1300 further comprises a processor 1302 and a memory 1304, and the memory 1304 contains instructions executable by the processor 1302, whereby the wireless device 1300 is operable to perform a method for performing CSI measurements as described above (e.g. the method shown in FIG. 9 or FIG. 11). Thus, in one example the wireless device 1300 is operable to transmit, to a network node 1200, information indicating whether a CSI-IM resource configuration restriction applies for the wireless device 1300, to receive, from the network node 1200, one or more CSI-IM resource configurations, wherein the configurations are dependent on whether the CSI-IM resource configuration restriction applies for the wireless device 1300, and to perform measurements in accordance with the received one or more configurations, and transmit one or more CSI reports comprising the measurements to the network node 1200.

The wireless device 1300 may further comprise other functional units, and may further comprise one or more storage units.

Further embodiments provide a computer program product for execution by a network node arranged to configure interference measurements for a wireless device, the computer program product comprising program instructions for receiving, from the wireless device, information indicating whether a channel state information interference measurement, CSI-IM, resource configuration restriction applies for the wireless device, and for configuring CSI-IM resources for the wireless device based on the information.

Yet further embodiments provide a computer program product for execution by a wireless device arranged to perform channel state information measurements, the computer program product comprising program instructions for transmitting, to a network node, information indicating whether a CSI-IM resource configuration restriction applies for the wireless device, for receiving, from the network node, one or more CSI-IM resource configurations, wherein the configurations are dependent on whether the CSI-IM resource configuration restriction applies for the wireless device, and for performing measurements in accordance with the received one or more configurations, and transmitting one or more CSI reports comprising the measurements to the network node.

It should be noted that the applicability of the methods and devices described herein is not restricted to dynamic TDD, but could also be applied in other situations or scenarios, e.g. CoMP.

It should be noted that although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure.

Within the context of this disclosure, the term "wireless device" encompasses any type of wireless node which is able to communicate with a network node, such as a base station, or with another wireless device by transmitting and/or receiving wireless signals. Thus, the term "wireless device" encompasses, but is not limited to: a user equipment, a mobile terminal, a stationary or mobile wireless device for machine-to-machine communication, an integrated or embedded wireless card, an externally plugged in wireless card, a dongle etc. The wireless device may also be a network node, e.g. a base station. Throughout this disclosure, whenever the term "user equipment" is used this should not be construed as limiting, but should be understood as encompassing any wireless device as defined above.

When using the word "comprise" or "comprising" it shall be interpreted as non-limiting, i.e. meaning "consist at least of".

What is claimed is:

1. A method performed by a base station for configuring interference measurements for a user equipment (UE), the method comprising:
   receiving, from the UE, information indicating whether a channel state information interference measurement (CSI-IM) resource configuration restriction with respect to zero-power channel state information reference signal (CSI-RS) configurations applies for the UE; and
   configuring CSI-IM resources for the UE based on the information, wherein said configuring comprises configuring two or more CSI-IM resources for one CSI process for the UE when the information indicates that the CSI-IM resource configuration restriction with respect to zero-power CSI-RS configurations does not apply.

2. The method of claim 1, wherein each CSI-IM resource is associated with a CSI process.

3. The method of claim 1, wherein the information indicates whether the UE is restricted to receiving CSI-IM resource configurations that are all completely overlapping with one zero-power CSI-RS resource configuration which can be configured for the UE.

4. The method of claim 3, wherein the information indicates whether the UE is restricted to receiving CSI-IM resource configurations wherein all CSI-IM resources fall on the same k×5 millisecond time grid, k being an integer greater than or equal to 1.

5. The method of claim 1, further comprising receiving, from the UE, one or more CSI reports comprising interference measurements derived according to the configured CSI-IM resources, and utilizing the CSI reports for performing scheduling and/or link adaptation.

6. A base station for configuring interference measurements for a user equipment (UE), the base station comprising processing circuitry and a memory, the memory containing instructions executable by the processing circuitry, whereby the base station is configured to:
   receive, from the UE, information indicating whether a channel state information interference measurement (CSI-IM) resource configuration restriction with respect to zero-power channel state information reference signal (CSI-RS) configurations applies for the UE; and
   configure CSI-IM resources for the UE based on the information, wherein said configuring comprises configuring two or more CSI-IM resources for one CSI process for the UE when the information indicates that the CSI-IM resource configuration restriction with respect to zero-power CSI-RS configurations does not apply.

7. The base station of claim 6, wherein each CSI-IM resource is associated with a CSI process.

8. The base station of claim 6, wherein the information indicates whether the UE is restricted to receiving CSI-IM resource configurations that are all completely overlapping with one zero-power CSI-RS resource configuration which can be configured for the UE.

9. The base station of claim 8, wherein the information indicates whether the UE is restricted to receiving CSI-IM resource configurations wherein all CSI-IM resources fall on the same k×5 millisecond time grid, k being an integer greater than or equal to 1.

10. The base station of claim 6, wherein the base station is further configured to receive, from the UE, one or more CSI reports comprising interference measurements derived according to the configured CSI-IM resources, and utilize the CSI reports for performing scheduling and/or link adaptation.

11. A method performed by a user equipment (UE) for performing channel state information (CSI) measurements, the method comprising:
   transmitting, to a base station, information indicating whether a channel state information interference measurement (CSI-IM) resource configuration restriction with respect to zero-power channel state information reference signal (CSI-RS) configurations applies for the UE;
   receiving, from the base station, one or more CSI-IM resource configurations, wherein the configurations are dependent on whether the CSI-IM resource configuration restriction with respect to zero-power CSI-RS configurations applies for the UE, and wherein the received one or more CSI-IM resource configurations comprise a configuring of two or more CSI-IM resources for one CSI process for the UE when the information indicates that the CSI-IM resource configuration restriction with respect to zero-power CSI-RS configurations does not apply; and
   performing measurements in accordance with the received one or more configurations, and transmitting one or more CSI reports comprising the measurements to the base station.

12. The method of claim 11, wherein each CSI-IM resource is associated with a CSI process.

13. The method of claim 11, wherein the information indicates whether the UE is restricted to receiving CSI-IM resource configurations that are all completely overlapping with one zero-power CSI-RS resource configuration which can be configured for the UE.

14. The method of claim 13, wherein the information indicates whether the UE is restricted to receiving CSI-IM resource configurations wherein all CSI-IM resources fall on the same k×5 millisecond time grid, k being an integer greater than or equal to 1.

15. The method of claim 11, further comprising sending, to the base station, one or more CSI reports comprising interference measurements derived according to the configured CSI-IM resources, for use by the base station for performing scheduling and/or link adaptation.

16. A user equipment (UE) configured for performing channel state information (CSI) measurements, the UE comprising processing circuitry and a memory, wherein the memory contains instructions executable by the processing circuitry, whereby the UE is configured to:
   transmit, to a base station, information indicating whether a CSI-IM resource configuration restriction applies for the UE;
   receive, from the base station, one or more CSI-IM resource configurations, wherein the configurations are dependent on whether the CSI-IM resource configuration restriction applies for the UE, and wherein the received one or more CSI-IM resource configurations comprise a configuring of two or more CSI-IM resources for one CSI process for the UE when the information indicates that the CSI-IM resource configuration restriction with respect to zero-power CSI-RS configurations does not apply;
   perform measurements in accordance with the received one or more configurations, and transmit one or more CSI reports comprising the measurements to the base station.

17. The UE of claim 16, wherein each CSI-IM resource is associated with a CSI process.

18. The UE of claim 16, wherein the information indicates whether the UE is restricted to receiving CSI-IM resource configurations that are all completely overlapping with one zero-power CSI-RS resource configuration which can be configured for the UE.

19. The UE of claim 18, wherein the information indicates whether the UE is restricted to receiving CSI-IM resource configurations wherein all CSI-IM resources fall on the same k×5 millisecond time grid, k being an integer greater than or equal to 1.

20. The UE of claim 16, wherein the UE is further configured to send, to the base station, one or more CSI reports comprising interference measurements derived according to the configured CSI-IM resources, for use by the base station for performing scheduling and/or link adaptation.

* * * * *